July 12, 1960 R. A. BUTTKE 2,944,376
GRINDER ATTACHMENT FOR WOODWORKING MACHINES
Filed June 22, 1954 4 Sheets-Sheet 1

INVENTOR
RICHARD A. BUTTKE
BY *Strauch, Nolan + Diggins*
ATTORNEYS

Fig. 2A

United States Patent Office 2,944,376
Patented July 12, 1960

2,944,376
GRINDER ATTACHMENT FOR WOODWORKING MACHINES

Richard A. Buttke, Milwaukee, Wis., assignor to Rockwell Manufacturing Company, Pittsburgh, Pa., a corporation of Pennsylvania Filed June 22, 1954, Ser. No. 438,570

24 Claims. (Cl. 51—249)

The present invention relates to cutter blade conditioning attachments for use with woodworking machines such as jointers and planers, and more particularly to an attachment for conditioning in situ the cutter blades of a woodworking machine having a work table and a rotary cutter head fixedly supported with respect to the work table, to provide blade cutting edges in exact parallelism to the work support surface of the work table.

This application is a continuation-in-part of my copending application Serial No. 250,345, filed October 8, 1951, now Patent No. 2,792,036, dated May 14, 1957.

For best operation of a planer or jointer or similar woodworking machine, it is not only necessary that the cutter blades be kept sufficiently sharp to cut easily and cleanly, but equally necessary that all blades be ground so that the cutting edges thereof are exactly parallel to the surface of the work table against which the work is pressed as it is passed through the machine. If the cutter blade edges and work table are not thus aligned, the cut taken by each blade varies in depth across the width of the work piece and produces an inaccurate surface on the workpiece resulting in poor fitting of the pieces in assembly of the article being produced and oftentimes waste of the entire work piece. It is to be noted that parallelism between the blade cutting edges and the peripheral surface or axis of the cutter head is not essential to accurate alignment of the bladge edges and work table since the desired relation of the workpiece surfaces are determined by guide fences and gauges having a predetermined relation to the table surface. The blade edges therefore, should preferably be made parallel to the work table even though they are not precisely parallel to the peripheral surface or axis of rotation of the cutter head.

It is also necessary that corresponding points (the midpoints, for example), of all of the cutter blades be equidistantly spaced from the axis of rotation of the cutter head; otherwise the cuts taken by the different blades will be of different depths and the finished surfaces of the work piece will not be perfectly plane and free of irregularities. For optimum performance of a planer or jointer its cutter blades must be so ground as to satisfy the additional requirement that the cutting edges of all blades have the desired relief angle, a proper relief angle being necessary to clean and efficient cutting by the blades. The cutter blade conditioning attachment of this invention has been found to be capable of dressing the cutter head blades in a manner such as to satisfy all of these requirements.

It is, therefore, a primary object of this invention to provide a cutter blade conditioning attachment capable of dressing the cutting edges of cutter head blades into proper parallelism with the work table of the machine in which the cutter head is mounted.

A further important object of the invention is to provide a unitary blade conditioning attachment in which the conditioning tool is mounted in a support member whose movement is positively controlled by engagement with a guide surface which is exactly parallel to the surface of the work table but which is separate therefrom, so that the desired relationship between the work table and blade cutting edges may be obtained without wear of the work table due to movement of the conditioning tool support thereon.

It is a further object of this invention to provide a blade conditioning attachment including an indexing device for positively locating the cutter head in the positions necessary for determining the proper relief angle of the cutter blades thereof, and to provide means permitting adjustment of the indexing device to effect small changes in cutter head position and corresponding changes in the relief angle to which each blade is ground.

A still further object of the invention is the provision of a portable blade conditioning attachment including clamping means permitting use of a single attachment on a number of jointers or planers differing in structure and size.

It is a further object of this invention to provide a cutter blade conditioning attachment adapted to alternately support a blade grinder and a jointing stone in position for grinding and dressing the blades.

It is also an object of this invention to provide a blade conditioning attachment adapted to accommodate both blade grinding and blade jointing tools, whereby the same attachment may be used for both grinding and jointing the cutter blades.

It is another object of this invention to provide a unitary blade conditioning attachment which is light in weight, relatively simple in structure, readily portable and easily attached to the machine on which it is to be used to assure proper grinding of the blades.

These and other objects of this invention will become more fully apparent by reference to the appended claims and the following detailed description when read in conjunction with the accompanying drawings, wherein:

With continued reference to the drawings wherein the same reference numerals are used throughout to indicate the same parts, the combined grinding and jointing attachment, as adapted for use in sharpening the cutter head blades of a planer while the cutter head is mounted in its normal position in the planer, is shown in Figures 1 to 4 wherein the outline of the related parts of the planer is shown in phantom lines to illustrate the mounted position of the attachment.

Figure 1:
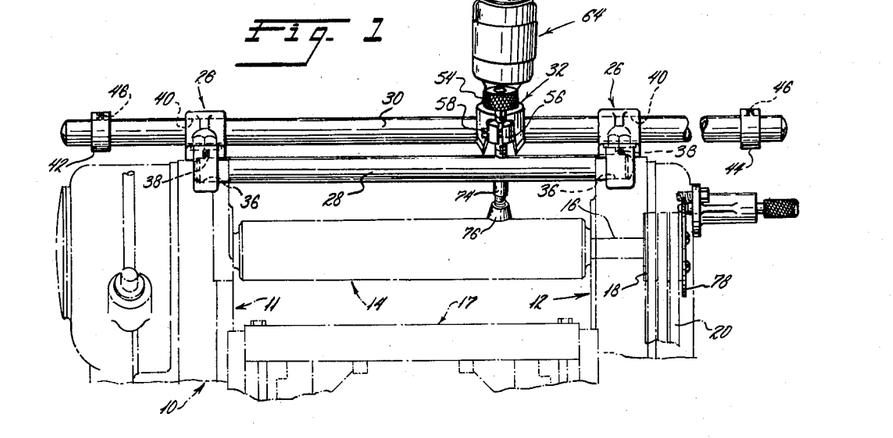
Figure 1 is a front elevational view of the combined grinding and jointing attachment of my present invention as adapted for use with a planer, the related parts of the planer being shown in phantom lines to illustrate the mounted position of the attachment.

The planer illustrated in Figure 1 is of the type disclosed in my copending application Serial No. 250,345 referred to above. The blade conditioning attachment of Figure 1 is not restricted to use with planers of this particular type, however, but may equally well be used with other and different planers. Slight changes in the attachment mounting structure may of course be necessary to properly fit the attachment to the particular planer with which it is to be used.

Figure 9:
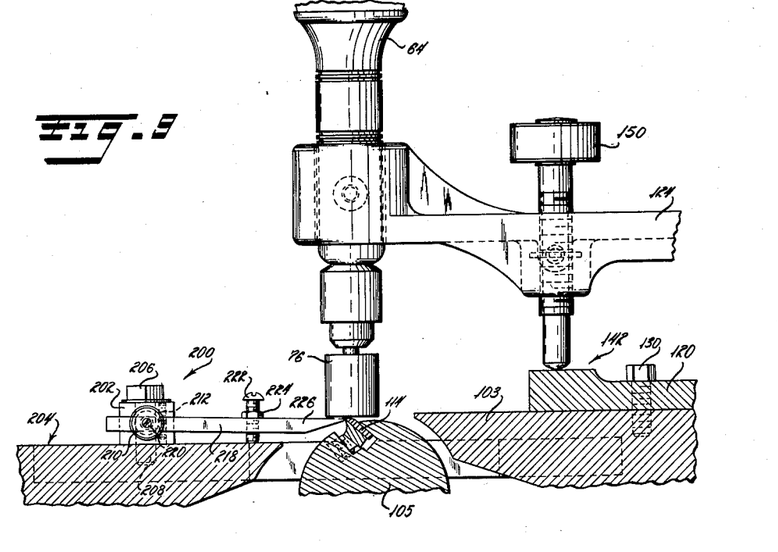
Figure 9 is a side view taken substantially along the line 9—9 of Figure 8.

As shown in Figure 1, the planer 10 comprises a pair of vertcial columns 11 and 12 upstanding from a base (not shown) and a cutter head 14 having a shaft 16 journalled for rotation in columns 11 and 12 above a horizontally disposed work table 17 positioned between the columns. Cutter head 14 is driven by a pulley 18 engaged by belt 20, the belt being connected to a motor mounted on the base of the planer. Cutter knife blades 22 are, as best shown in Figure 9, adjustably mounted in slots cut in the periphery of cutter head 14 in well known manner.

In operation planers such as that illustrated are usually provided with a chip breaker and cutter head guard structure which is mounted between columns 11 and 12 above cutter head 14. Figure 1 shows the planer with this structure removed, since its removal is necessary to permit access to cutter head 14 by the blade dressing tools of the grinding and jointing attachment.

The vertical columns 11 and 12 have planar mounting pads 23 machined on the tops thereof in accurate parallelism to the surface of table 17 to provide seating surfaces for the attachment mounting structure. Each of the mounting pads 23 is adapted to engage mating planar surfaces 24 formed on the attachment mounting structure, bolt and nut assemblies 25 being provided to securely clamp the attachment to the tops of the columns.

The attachment frame structure includes a pair of mounting brackets 26, a fixed guideway in the form of a guide rod 28 and a movable support rod or hinge pin 30 for supporting a cutter blade conditioning tool mounting assembly comprising a support arm 32. Brackets 26 are each formed with spaced apertures 33 (Figure 2) which are so located that, after removal of the nuts 34 of bolt and nut assemblies 25, the bolts 35 will extend therethrough. These brackets may thus be clamped firmly to the top of the column castings 11 and 12 by tightening the nuts 34 on the bolts 35 after placing the brackets in position.

The ends of the front or fixed guide rod 28 are received within bores 36 (Figure 1) of the brackets 26 and fixed therein by set screws 38.

The rear or movable support rod 30 is received through coaxially aligned bores 40 in the rear end of the brackets 26 for free axial and pivotal movement relative thereto. Movement limit collars 42 and 44 are preferably fixed to the support rod 30 near its ends exteriorly of the brackets 26 by set screws 46.

The front and rear rods 28 and 30 are parallel to each other, and both are parallel to the work support surface of work table 17. The mounting brackets 26 serve to maintain these rods fixed in this relationship.

The support arm 32 is formed at its rear end with a bore (not shown), through which the support rod 30 extends, and is split as indicated at 48 (Figure 2) so that it may be clamped firmly to rod 30 by a clamping screw 50. At its forward end arm 32 is formed with a threaded hole 52, the axis of which is substantially normal to and intersects that of the front guide rod 28. An adjusting screw 54 is threadedly received in hole 52 and its end abuts against the rod 28 so that the position of the arm 32 about the axis of rod 30 can be adjusted by manipulation of screw 54. As is best shown in Figure 1, the front end of arm 32 is split at 56 and a clamping screw 58 is provided for clamping adjusting screw 54 in its adjusted position.

Figure 2:
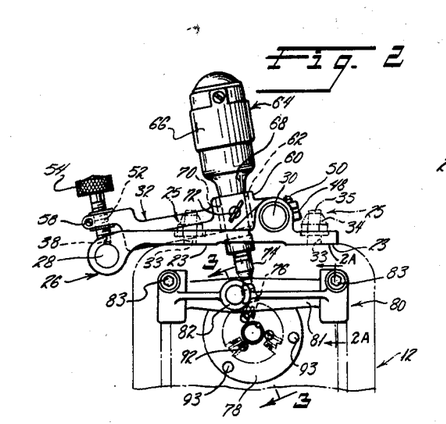
Figure 2 is a right side view of the attachment of Figure 1, the planer parts being shown in phantom lines.

Support arm 32 adjacent its end secured to guide rod 30 is formed with a boss 60 having a bore 62. Within this bore 62 the blade conditioning tool holder is mounted. As shown in Figures 1 and 2, the blade conditioning tool takes the form of a grinder 64 comprising a motor housing portion 66 and a relatively smaller shaft housing portion 68 which projects through bore 62 in support arm 32. A split cylindrical steel sleeve 70 is inserted within the bore 62 around this smaller portion 68 and the sleeve is wedged against the portion 68 by a thumb screw 72 to firmly hold the grinder 64 in adjusted position relative to the arm 32. Sleeve 70 prevents collapsing of the hollow housing portion 68 by the screw 72.

Figure 10:
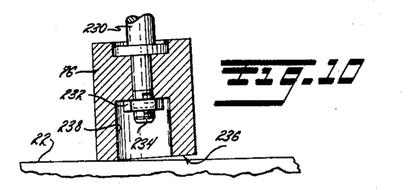
Figure 10 is a detail view showing a grinding stone and its relationship to the cutter knife blade being dressed thereby.

The motor shaft (not shown) extends downwardly through the housing portion 68 and a chuck 74 is secured to its projecting end for rotation therewith. A grinding stone 76, which is shown in detail in Figure 10, may be mounted in chuck 74 as by a stub shaft 230 held in the stone by a nut member 232 engaging the threaded end 234 of the shaft, its other end being clamped in chuck 74 in any suitable manner. As is apparent in Figure 10, grinding stone 76 has an annular grinding surface 236 provided by a central circular recess 238 opening inwardly through the lower face of the stone and accommodating nut member 232 of the stub shaft.

As shown in Figure 1, grinder 64 and its grinding stone 76 are mounted with their common axis of rotation canted from the perpendicular to the plane of the cutter blade cutting edge being ground, the cant being in the plane normal to said cutting edge plane, including said perpendicular and paralleling the length of the cutter blade. This inclination of the grinder axis with respect to the cutter blade preferably is such that only one side of the annular grinding surface of the grinding stone contacts the cutter blade being dressed by the stone. This is clearly shown in Figure 10, wherein only the left hand side of the grinding surface 236 of grinding stone 76 contacts knife blade 22, the right hand side of the stone clearing the blade as shown. I have found that grinding stones thus canted to the knife blades will produce sharper and more uniform cutting edges on the knife blades than will stones having the conventional vertical mounting. It is to be noted that the grinder axis is also inclined to the vertical in the plane normal to the cutter blades (Figure 2), but in this plane is parallel to the perpendicular to the plane of the cutter blade cutting edge being ground, and may be maintained in such relationship by concurrent adjustment of grinder housing 68 in its sleeve 70 and of adjusting screw 54.

In order that the knife blades 22 be properly ground, it is necessary that the knife blades be held rigidly in position while the grinding wheel is fed along the length thereof. For this purpose I have, in this form of the invention, provided an indexing device which includes an index disc 78 adapted to be mounted on the pulley 18 on the end of shaft 16 of the cutter head 14 and an indexing pin and mount assembly 80 adapted to be mounted on column 12 and to coact with disc 78 to hold the cutter head in a plurality of equiangularly spaced positions equal in number to the cutting knives on the cutter head.

Figure 3:
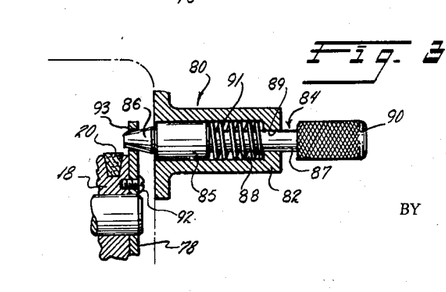
Figure 3 is a fragmentary sectional view of the cutter head indexing mechanism for the attachment of Figure 1, which is used during the blade grinding operation.

The indexing pin and mount assembly 80 includes a bracket 81 (Figure 2) having a hollow boss 82 adapted to be fixed exteriorly to the outer side wall of column 12 as by screws 83. As is best shown in Figure 3, a pin 84 having a cylindrical portion 85, a tapered portion 86 and a stem 87 is mounted within the recess 88 of boss 82, the stem portion 87 projecting through a coaxial aperture 89 in the end thereof and having a knurled knob 90 fixed to its end. A compression spring 91 surrounds the stem portion 87 within the recess 88 and resiliently engages the cylindrical portion 85 to bias the indexing pin toward disc 78.

As is shown in Figures 2 and 3, index disc 78 is fixed to pulley 18 by a plurality of screws 92 and is formed with three apertures 93 which are located radially equidistant from the cutter head axis of rotation and are equiangularly disposed about that axis in predetermined relation to assure proper presentation of the knife blades to grind stone 76. The tapered end 86 will be biased by spring 91 into the aligned one of the apertures 93 as is shown in Figure 3 to hold the cutter head 14 in one of three fixed positions.

Figure 2A:
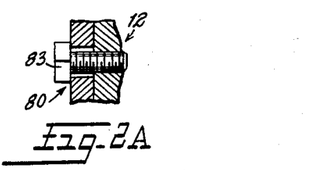
Figure 2A is a fragmentary sectional view taken along the lines 2A—2A of Figure 2.

As is shown in Figure 2A, the screws 83 pass through holes in bracket 81 which are larger than the shanks of screws 83 so that the bracket 81 can be shifted within limits relative to the cutter head 14 while the screws 83 are loose. Since the relief angle ground on the knife blades 22 depends on the angular position of the knife blade relative to the grinding stone 76 during the grinding operation, this relative position can be varied by shifting the bracket 81 within its limits of movement to rotate the cutter head 14 through the engagement of pin 84 with the aligned aperture 93 of index disc 78. An adjustment by which the relief angle ground on the knife blades 22 may be varied is thus provided.

For the purpose of grinding the knife blades 22, therefore, it is merely necessary to attach the disc 78 to the pulley 18, mount the indexing pin and mount assembly 80 on the exterior of column 12, and mount the sharpening tool mounting structure across the top of columns 11 and 12. The cutter head is rotated manually until the indexing pin 84 engages an aperture 93 to lock the cutter head in position for the grinding of one of its knives. The position of the grinding stone 76 relative to the cutting knife 22 is adjusted by screw 54 and the adjustment locked by screw 58. The operator then lifts the grinding stone 76 from contact with the cutting knife by pivoting rod 30 and arm 32 about their common pivot axis, shifts the arm 32 to one end of the cutting knife by pulling rod 30 to its limit position toward him, starts the grinder motor, lowers the grinding stone into contact with the cutting knife until the end of screw 54 rests on the guideway 28, and, while holding the arm firmly in the position with one hand, feds the grinder along the length of the knife by pushing rod 30 from him to its opposite limit position. After a grinding cut has been taken on one blade, the pin 84 is pulled out and the cutter head rotated until the next cutting knife is in position and the grinding operation is repeated.

After the grinding of all knives has been completed, the same sharpening tool support structure is utilized for jointing the knives. For this purpose the indexing pin and mount assembly 80 and the grinder are removed and a jointing stone 94 (Figure 4) is mounted within recess 95 of the head 96 of an adapter 97 substituted for the grinder 64. The stone 94 is fixed within the recess 95 by screws 98 and the adapter 97, which has a cylindrical stem 99, is fixed within the bore 62 of arm 32 by screw 72 in the same manner as was grinder 64. After the planer is started so that the cutter head 14 is rotating at normal operating speed, the jointing stone 94 is fed back and forth along the rotating cutter head in the same manner as was the grinder 64.

Figure 5:
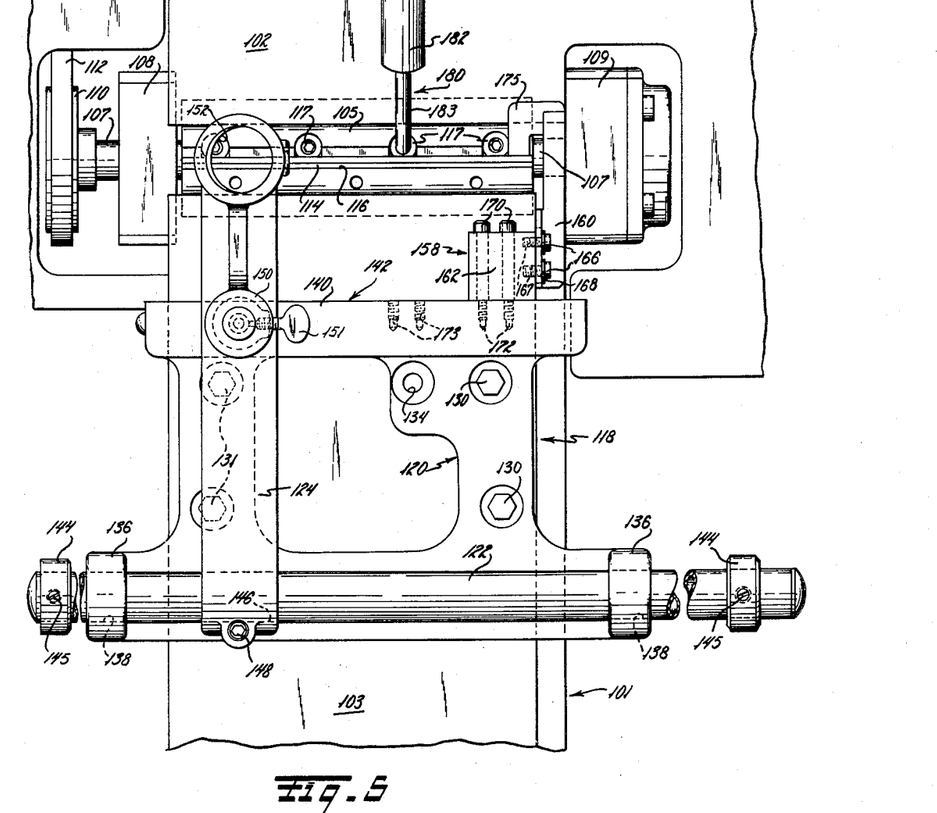
Figure 5 is a top plan view of a modified form of my grinding and jointing attachment as adapted for use on a jointer, only those parts of the jointer necessary to an understanding of the present invention being illustrated.
Figure 6:
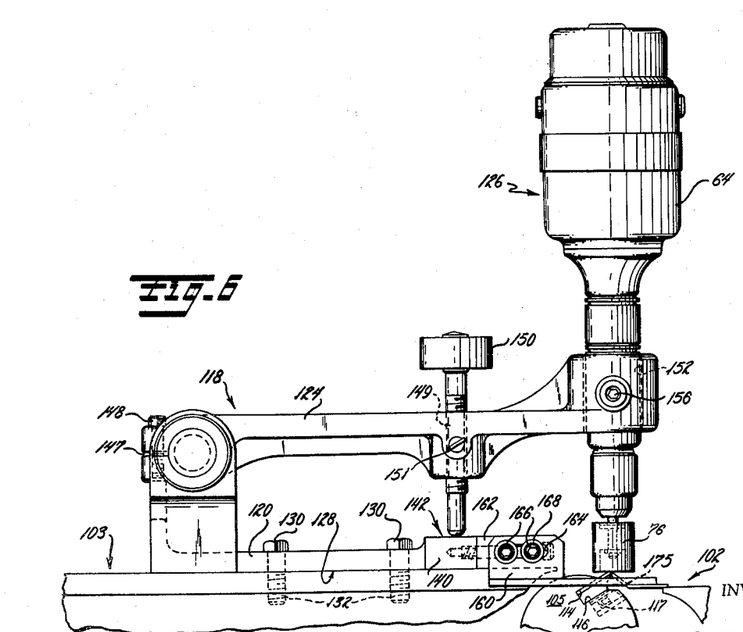
Figure 6 is a right side view of the attachment shown in Figure 5.

A modification of the grinding attachment of Figure 1 is illustrated in Figures 5 and 6, wherein the attachment is shown mounted on a jointer. The jointer shown is of the conventional type having a bed 101 made up of front and rear work tables 102 and 103, respectively, between which is positioned a rotary cutter head 105. Cutter head 105 is mounted on a shaft 107, which is journaled in bearings 108 and 109 fixedly supported in relation to tables 102 and 103. Shaft 107 is provided with a pulley 110 drivingly connected to a motor (not shown) by belt 112. Cutter knife blades 114 are adjustably mounted in slots 116 cut in the periphery of the cutter head 105, the blades being held in adjusted position within the slots 116 by lock nuts 117.

The grinding attachment 118 is shown mounted on rear work table 103, and comprises a support frame including a base plate 120 and a movable support rod or hinge pin 122 for mounting a cutter blade conditioning tool mounting assembly in the form of a support arm 124 carrying a blade conditioning tool 126.

The under surface 128 of base plate 120 is machined flat so that the base plate may lie firmly against the flat work support surface of work table 103. Base plate 120 may be fixed in position on the work table in any suitable manner. In Figures 5 and 6, it is fastened by means of bolt members 130 and 131 which extend through bores in the base plate and have threaded ends 132 engaging in threaded holes in the work support surface of work table 103. The bolts 130 and 131 may be tightened down to firmly clamp the base plate to the work table.

In Figures 5 and 6 the grinding attachment is shown as mounted on the work table of an 8 inch jointer, which is a jointer size presently in very common use. Jointers having 4- and 6-inch cutters also are in common use, and the grinding attachment may in accordance with the invention be adapted to use on jointers of these and other sizes. To this end, an additional bore or bores 134 may be provided in base plate 120 spaced inwardly of the bores receiving bolts 130. When the attachment is to be used with jointers of sizes smaller than that shown in Figures 5 and 6, one of the bolts 130 is omitted and the other inserted through bore 134 into threaded engagement with a tapped bore provided in the surface of the work table. The two bolts 131, together with that through bore 134, then securely clamp the base plate to the narrower work table. Alternatively, the grinding attachment may be clamped to jointer work tables of different sizes by means of the clamp bracket shown in Figure 7, which will be more fully described hereinafter with particular reference to that figure.

Formed integrally with base plate 120 are a pair of support brackets 136 having coaxially aligned bores 138 therethrough the walls of which are machined parallel to surface 128 of base plate 120. Base plate 120 also has formed thereon a laterally extending boss member 140. The upper surface of this member is machined flat and parallel to the under surface 128 of base plate 120, to provide a guideway 142 extending in longitudinal parallelism with surface 128 and with the axis of the coaxially aligned bores 138 in support brackets 136.

Support rod 122 is pivotally and slidably mounted within the bores 138 in support brackets 136, and may be prevented from sliding out of these bores by movement limit collars 144 fixed on each of its ends as by set screws 145.

Support arm 124 is formed at one end with a bore 146 (Figure 5) through which support rod 122 extends, and is split as indicated at 147 (Figure 6) so that it may be firmly clamped to rod 122 by clamping screw 148. A threaded hole 149 is formed in support arm 124 intermediate its ends and at right angles to bore 146 to receive an adjusting screw 150 which may be locked in adjusted position as by a wing screw 151. The lower end of this adjusting screw slidingly engages the guideway 142 formed on base plate 120, in order that manipulation of the adjusting screw may adjust the position of support arm 124 about the axis of rod 122 on which it is mounted.

Figure 4:
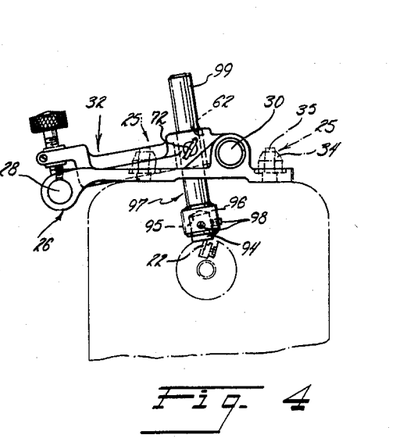
Figure 4 is a right side view of the attachment of Figure 1 as adapted for use in jointing the knife blades.

The end of support arm 124 opposite its point of connection to rod 122 is provided with a mounting bore 152 also disposed substantially normal to bore 146. Bore 152 receives the blade grinding and joining tools, either one of which may be fixed in the bore 152 as by a set screw 156. Figure 6 shows a grinder 64 mounted in place on the support arm; when it is desired to joint the blades this grinder is removed and a joining stone such as shown in Figure 4 is substituted therefor.

Grinder 64 is mounted with its axis of rotation tilted from the vertical in substantially the same manner and for the same purpose as described above with reference to Figures 1 and 10, the tilt being obtained by forming the support arm bore 152 in which the grinder is mounted at a slight angle to the vertical.

In general, it is preferred that the axis of grinding stone 76 intersect the surface of the knife blade cutting edge at or near the center of that surface, so that the cut taken by the side of the grinding stone which contacts the blade will be as nearly normal to the length thereof as possible. The fore and aft adjustment of the grinding stone 76 necessary to obtain this desired relationship may be effected by shifting the entire grinding attachment relative to the jointer cutter head. This may be accomplished by adjusting the height setting of the work table 103 on which the attachment is mounted, since in jointers such as shown in Figures 5 and 6 vertical adjustment of the work tables conventionally is accompanied by longitudinal movement thereof either toward or away from the cutter head. This characteristic of the conventional jointer may in accordance with the invention thus be utilized to provide fore and aft adjustment of the grinding attachment. It is to be noted that this adjustment usually requires concurrent manipulation of adjusting screw 150, to readjust the vertical position of the grinding stone so as to maintain the depth of cut thereof constant.

The attachment shown in Figures 5 and 6 includes an indexing device 158 which, unlike that of Figure 1 is unitary with the grinder support assembly. Indexing device 158 comprises an index arm 160 bolted to a mounting block 162 which is in turn bolted to base plate 120. Index arm 160 has an elongated slot 164 (Figure 6) cut in the portion thereof fitting against mounting block 162, and bolts 166 pass through this slot and into threaded holes 167 in mounting block 162 to clamp the index arm firmly against the mounting block. Slot 164 is made sufficiently long to permit lateral adjustment of the index arm relative to the mounting block. To make this adjustment it is only necessary to loosen bolts 166, move index arm 160 to the desired position, and retighten the bolts. Bolts 166 may, if desired, be provided with washers 168 to prevent damage to the edges of slot 164 and to facilitate movement of the bolts within the slot.

Mounting block 162 is fixed to base plate 120 by means of bolts 170 passing through bores in the mounting block and engaging in threaded holes 172 in the base plate. Additional sets of threaded holes may be provided in the base plate—one such additional set being shown at 173 in Figure 5—to permit use of the attachment and its indexing device on jointers of different sizes.

Index arm 160 has a locating finger 175 fixed thereto or formed integrally therewith, the locating finger being positioned to engage one of the cutter head blades 114 to properly position the cutter head while that blade is being ground. It will be noted that locating finger 175 prevents rotation of the cutter head in the forward direction (clockwise in Figure 6), but permits rotation thereof in the reverse (counter-clockwise) direction. The shape and resilience of the locating finger are such as to permit it to ride over the cutter blades and other protuberances on the cutter head when rotated in this latter direction.

It is necessary that the cutter head be restrained against rotation in both directions while grinding the cutter blades, if the blades are to be held stationary and in the proper position to be ground. The cutter head is restrained against rotation in the direction not prevented by locating finger 175 (i.e., counter-clockwise in Figure 6) by the weight of the grinder motor and support assembly, which presses downwardly on the cutter blade and urges it into firm engagement with locating finger 175. While this normally is adequate to maintain the cutter head in proper position for dressing the blade, further restraint against movement thereof may if necessary be provided by any convenient restraining device, such as the counter-weight assembly 180 shown in Figure 5. This assembly comprises a relatively heavy weight member 182 fixed to one end of a rod 183 the other end of which may be attached to cutter head 105 by inserting it into one of the cutter blade slots 116 or lock nuts 117. The weight of member 182 should be such that the counterweight assembly is capable of holding the cutter blade being ground firmly in engagement with locating finger 175 during the grinding operation.

In grinding the several cutter blades, cutter head 105 is first rotated in the forward direction (clockwise as viewed in Figure 6) until one of its blades 114 comes into position to be engaged and held by locating finger 175. Counterweight assembly 180 is then attached to the cutter head to maintain the blade in firm engagement with the locating finger, and the blade is then ground. After the grinding of this blade is completed the counterweight is removed and the cutter head rotated, in the reverse (counter-clockwise) direction, until the next blade has passed under locating finger 175. The cutter head is then again rotated in the forward direction to bring this next blade into firm engagement with the locating finger, after which the counterweight assembly may be reattached to the cutter head and the blade ground. During these operations drive belt 112 should be disconnected from pulley 110, to permit free rotation of the cutter head except as limited by indexing means 158.

The relief angle to which blades 114 are ground may be varied by adjusting the position of index arm 160, relative to its mounting block 162, in the manner described above. This adjustment affords a very simple but extremely precise control of the position cutter head 105 and thus of the relief angle ground on its blades 114.

For jointing the cutter blades a jointing stone assembly such as shown in Figure 4 is substituted for grinder 64. Since the cutter head is rotated during the jointing operation it is necessary to remove indexing device 158 and counterweight assembly 180, and to reconnect pulley 110 and drive belt 112, before this operation can be performed.

Figure 7:
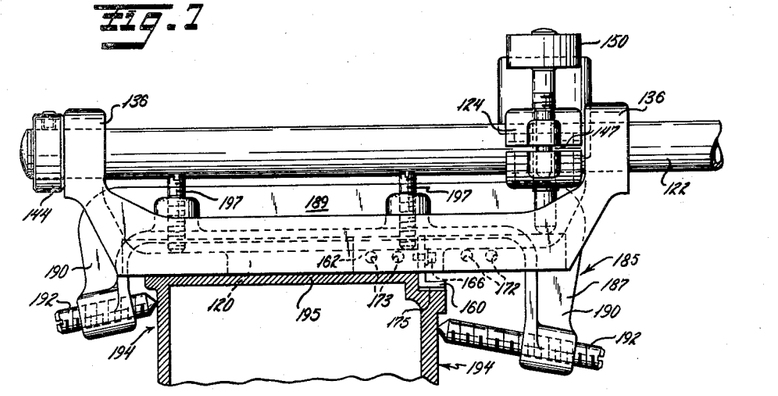
Figure 7 is an end view of an attachment similar to that of Figure 5 but provided with different clamping means and arranged for use on a smaller jointer than that shown in Figure 5.

The attachment shown in Figure 7 is similar to that of Figures 5 and 6 except as to the means employed in fixing the attachment base plate to the jointer work table. A clamping assembly such as indicated at 185 in Figure 7 may be substituted for the base plate bolts 130 and 131 of Figure 5 whenever it is preferred not to mar the surface of the work table by provision of bolt holes therein or when for any reason use of mounting bolts located as shown in Figure 5 is not feasible.

Clamping assembly 185 comprises a C-shaped clamp member 187 positioned with its base portion 189 extending parallel to base plate 120 and its leg portions 190 extending downwardly beyond the base plate. Locking screws 192 are threaded through the ends of leg portions 190 and engage opposed surfaces 194 of work table 195 to fixedly secure clamp member 187 thereto. Clamp screws 197 pass through threaded bores in base portion 189 of member 187 and engage the upper surface of base plate 120. In use, clamp member 187 is first placed in position over the base plate and fixed to the work table by manipulation of lock screws 192; clamp screws 197 may then be tightened down to firmly clamp the base plate to the work table.

It will be noted that the work table and cutter head of Figure 7 are narrower than the corresponding elements of Figure 5. To accommodate the grinding attachment to use on this smaller jointer it may be necessary to adjust the position of indexing device 158 in order to enable it to engage the narrower cutter head. This adjustment may be made by removing bolts 170 (Figure 5) which secure mounting block 162 to base plate 120, and shifting the indexing device over to the position shown in dotted lines in Figure 7, in which position mounting block 162 will be located directly over a second set of bolt holes 173 (Figure 5) in base plate 120. Bolts 170 may then be reinserted, in holes 173, to clamp mounting block 162 in its adjusted postion.

Figure 8:
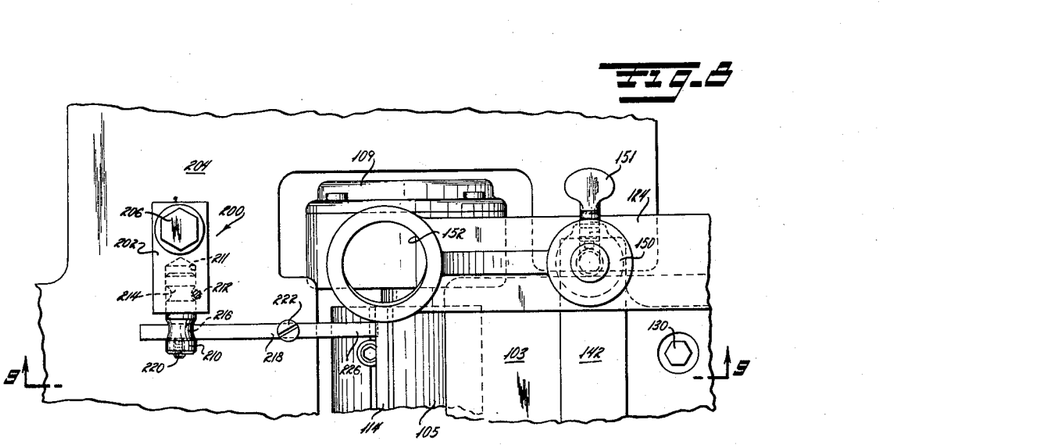
Figure 8 is a fragmentary top plan view of an attachment similar to that of Figure 5 but provided with a modified cutter head indexing mechanism.

Figures 8 and 9 show a grinding attachment generally similar to that of Figures 5–7 but having a modified cutter head indexing mechanism providing more positive restraint against cutter head rotation during the grinding operation. The indexing mechanism of Figures 5–7 has in general proven very satisfactory, but I have found that under some conditions the necessary resiliency of the cutter blade locating finger 175 may permit the finger to flex slightly under the weight of the grinder assembly, which is applied against the locating finger by the blade held thereby. The blade movement which results from such flexing of locating finger 175 is very slight and usually does not prevent attainment of a satisfactorily true cutting edge, but even this slight movement of the cutter head may be prevented and the head held perfectly stationary under the blade grinding conditions by use of the modified cutter head indexing mechanism illustrated in Figures 8 and 9.

The grinding attachment of Figures 8 and 9 is like that of Figures 5–7 except for the indexing mechanism which is generally indicated by reference numeral 200 and comprises a pivot block 202 detachably secured to the rabbet arm 204 of the jointer as by a bolt 206 extending through a bore in pivot block 202 with its end 208 threadedly engaged in a tapped bore in rabbet arm 204. A stop arm holder 210 is rotatably received in a bore 211 (Figure 8) provided in one end face of pivot block 202, and is held therein by a set screw 212 threaded into a vertical bore in pivot block 202 and having a portion of its periphery projecting into a peripheral groove 214 formed in the portion of stop arm holder 208 received within the pivot block. Set screw 212 thus secures stop arm holder 208 against axial movement out of the pivot block and at the same time permits pivotal movement thereof within the block.

Received within a transverse bore 216 formed in the projecting end of stop arm holder 208 is a knife blade stop arm 218 which is laterally adjustable within the bore 216 and adapted to be locked in adjusted position as by a set screw 220 threaded into an axial bore in the end face of stop arm holder 208. An adjusting screw 222, preferably provided with a lock nut 224 is threaded through stop arm 218 intermediate the ends thereof and serves to adjust the position of the stop arm so as to locate the knife stop edge 226 thereof in position to properly engage under the cutter knife blade being ground.

Thus, the knife blade stop arm and holder assembly is free to pivot about the axis of holder 208, the lower limit of this pivotal motion being determined by the setting of adjusting screw 222. Because of its pivotal mounting, stop arm 218 may ride over the cutter knives as the cutter head is rotated in a reverse direction (clockwise in Figure 9) to bring the individual knives into grinding position. Once in grinding position, the knife is restrained against forward rotation by engagement with the stop edge 226 of stop arm 218, and against reverse rotation by the weight of the grinder assembly applied to the blade. Additional restraining means, such as the counterweight assembly 180 shown in Figure 5, may if desired also be provided. Since stop arm 218 need not be resilient, as must the locating finger 175 in the indexing mechanism shown in Figures 5–7, it may be made sufficiently heavy and rigid to bear the weight of the grinder assembly without appreciable flexing or resultant blade movement.

Like that of Figures 5–7, the indexing mechanism of Figures 8 and 9 is adjustable to vary the angular position at which it holds the cutter knife blade and thus vary the relief angle to which the blade is ground. This adjustment, which is analogous to that provided by the elongated slot 164 and bolts 166 in Figures 5–7, may be effected by loosening set screw 220 and shifting stop arm 218 toward or away from the cutter head. Additionally, adjusting screw 222 permits vertical adjustment of the end 226 of the stop arm to properly engage under the blade being ground. It is to be noted that during the grinding operation the infeed work table and rabbet arm 204 are lowered sufficiently that stop arm 218 clears grinding stone 76, enabling the grinding stone to be passed directly over the stop arm to grind the entire length of the blade held thereby.

The indexing mechanism of Figures 8 and 9 may be applied to existing jointers merely by drilling and tapping a hole in the jointer rabbet arm 204. This tapped hole receives bolt member 206 of pivot block 202, and should be located so as to properly position the indexing mechanism with respect to the cutter head.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An attachment unit for conditioning the cutter blades of a woodworking machine, having a planar work support surface and a rotary cutter head fixedly journalled transversely of said work support surface so as to provide said cutter blades with cutting edges paralleling said work support surface, said unit comprising an attachment support frame comprising laterally spaced relatively fixed sidewalls having axially aligned through bores therein and integrally formed mounting pads having bottom support surfaces lying in a common plane paralleling the axis of said bores; guide means extending between and fixed in said through bores and having a rectilinear external surface parallel to said bore axis to form a guideway parallel to the plane of said mounting pad surfaces adapted when said attachment support frame is connected to said woodworking machine to be disposed in transverse parallel relation to said work support surface; a hinge pin supported between said sidewalls with its axis extending in spaced parallelism to said guideway and to the plane of said mounting pad surfaces; a blade conditioning tool mounting assembly carried by said hinge pin for pivotal movement around the axis of said hinge pin and including means for removably supporting thereon a blade conditioning tool adapted to be positioned in overlying relation to said cutter head when said support frame is operatively connected to said woodworking machine; manually releasable lock means for detachably securing said tool to said tool supporting means; a blade conditioning tool having a portion complemental to and mounted in said tool mounting means; support means carried by said blade conditioning tool mounting assembly for engaging said guideway and supporting said blade conditioning tool in contact with a selected cutter blade whereby movement of said blade conditioning tool in a transverse path paralleling said guideway and said work support surface is assured; and means on said blade conditioning tool mounting assembly adapting said blade conditioning tool mounting assembly for manual reciprocation in the direction of the axis of said hinge pin to move said blade conditioning tool in its predetermined transverse path from end to end of a selected cutter blade.

2. An attachment unit as defined in claim 1, wherein said blade conditioning tool comprises a self powered grinder.

3. An attachment unit as defined in claim 1, wherein said blade conditioning tool comprises a jointing stone.

4. An attachment unit for conditioning the cutter blades of a wood working machine having a rotary cutter head fixedly supported with respect to the work table to provide cutting edges in parallelism to the work support surface of said work table comprising a support assembly including a pair of axially aligned support brackets unitary with a support member having a rectilinear guideway surface formed thereon in parallelism to the coplanar support surfaces of said support brackets and having respective integral mounting pads thereon lying in a common plane paralleling said guideway for positioning said support assembly with said guideway in rigidly fixed transverse parallel relation to the work support surface of said work table; a rotatable support rod having its rotation axis parallel to and substantially spaced from said guideway surface rotatably and slidably mounted adjacent its opposite ends in said support brackets; a support arm fixed to said support rod intermediate said brackets for swinging movement into and out of overlying relation to said cutter head about the axis of said support rod and for reciprocal movement with said support rod in a path extending in longitudinal parallelism to said support rod; a cutter blade conditioning tool mounted on said support arm; and means carried by said support arm for engaging said guideway surface and guiding said cutter blade conditioning tool for movement in preselected spaced relation to the work support surface of said work table in all longitudinal positions of said support arm whereby said conditioning tool will move in a linear path parallel to said work support surface and uniformly condition each blade from end to end.

5. An attachment as defined in claim 4, together with indexing means including a member biased to operating position and freely movable to an inoperative position for locating and holding each blade of the cutter head in the proper position for conditioning the cutting edge thereof, said indexing means being adjustable to vary the relief angle to which the cutting edges are conditioned.

6. An attachment unit for conditioning the cutter blades of a woodworking machine having a work table providing a planar work support surface and a bladed cutter head journaled for rotation about an axis substantially parallel to said work support surface comprising a support frame including a planar base surface adapted to rest upon and thereby mount said frame in parallel relation to said work support surface and further including axially aligned spaced cylindrical bearing surfaces the axis of which is disposed in parallel relation to said planar base surface and a rectilinear guideway substantially spaced from said bearing surfaces and longitudinally paralleling the axis of said bearing surfaces; a hinge pin supported by said bearing surfaces in longitudinal parallelism with said guideway and with said planar base surface; a blade conditioning tool assembly carried by said hinge pin for pivotal movement about and reciprocating rectilinear movement parallel to the axis of said hinge pin and including means removably mounting a blade conditioning tool; and means carried by said blade conditioning assembly including a member abutting said guideway and supporting said blade conditioning tool in preselected spaced relation to the plane of said work support surface in all positions of said conditioning tool assembly whereby said conditioning tool will move in a linear path parallel to said work support surface and condition each blade uniformly from end to end.

7. An attachment unit for conditioning the cutter blades of a wood working machine having a rotary cutter head fixedly supported with respect to the work table to provide cutting edges in parallelism to the work support surface of said work table comprising a base plate adapted to be clamped to the work support surface of said work table; a hinge pin mounted on said base plate in transverse parallel relation to the work support surface of said work table; guide means unitary with said base plate defining a guideway parallel to and substantially spaced from said hinge pin and longitudinally paralleling the work support surface of said work table; a cutter blade conditioning tool assembly, including a blade conditioning tool, carried by said hinge pin for swinging movement into and out of overlying relation to said cutter head and for reciprocal movement in a path extending in longitudinal parallelism to said hinge pin; and means carried by said blade conditioning tool assembly for engaging said guideway and supporting said blade conditioning tool in preselected spaced relation to the work support surface of said work table whereby said conditioning tool will move in a linear path parallel to said work support surface and uniformly condition each blade from end to end.

8. In combination with a woodworking machine having a work table and a bladed cutter head journaled between spaced vertical columns for rotation about an axis substantially parallel to the work support surface of said work table and in which the tops of the vertical columns are formed with coplanar support surfaces parallel to the table work support surface, a blade conditioning unit for conditioning the cutter blades into exact parallelism with said work support surface comprising a pair of support brackets each formed with planar bottom surfaces and adapted to be respectively attached to said vertical columns with the bottom surfaces thereof in surface contact with said column top surfaces; a stationary support member fixedly secured at its opposite ends to said respective support brackets and having a guide surface to provide a rectilinear guideway parallel to said work support surface and substantially parallel to the axis of rotation of said cutter head; a second support member rotatably and slidably mounted adjacent its ends in said respective support brackets for rotational movement about and sliding movement axially of an axis parallel to the guide surface of said guideway; a support arm secured to said second support member intermediate said support brackets for rotational and rectilinear sliding movement therewith respectively about and parallel to the axis thereof, said support arm including a first portion rotatable into overlying relation with said guideway and a second portion rotatable into overlying relation with said cutter head, means adjustably carried by said first portion of the support arm adapted to abuttingly engage said guideway for positioning said support arm with respect to said guideway, mounting means carried by said second portion of the support arm adapted to successively receive a grinding tool and a jointing tool for grinding and jointing the blades of the cutter head of such a machine in situ, and manually releasable lock means on said support arm second portion for detachably securing such a tool to said mounting means.

9. The combination defined in claim 8, together with indexing means for locating each blade of the cutter head in proper position for conditioning the cutting edge thereof; said indexing means comprising an indexing disc having means thereon adapting it to be fixed to said cutter head for rotation therewith, said disc having a number of openings therein equal to the number of blades in the cutter head; an indexing pin assembly including a mounting bracket and an indexing pin slidably mounted in said bracket and adapted to project into each of said disc openings successively to lock said disc and cutter head in the proper positions for conditioning the cutter blades thereof; and fastening means for securing said mounting bracket to one of said vertical columns.

10. The combination defined in claim 9 wherein said fastening means is adjustable to permit adjustment of the position of said mounting bracket and indexing pin to vary the relief angle to which the cutter blades are conditioned.

11. For use on a woodworking machine having a work table mounted between spaced vertical columns and a bladed cutter head journaled in said columns for rotation about an axis substantially parallel to the work support surface of said work table; a blade conditioning attachment unit for dressing the cutting edges of the cutter blades of such a machine into exact parallelism with the work support surface thereof comprising a pair of support brackets each having coplanar bottom support surfaces and adapted to rest in surface contact with and to be attached to the top of one of the columns of such a machine; a sationary cylindrical support rod fixedly secured at its opposite ends in said respective support brackets with its axis parallel to the plane of said bracket bottom surfaces; a movable cylindrical support rod rotatably and slidably mounted adjacent its ends in said respective support brackets for pivotal movement about its axis and sliding movement axially of an axis parallel to said stationary support rod; a support arm rigidly connected to said movable support rod intermediate said brackets for rotational and sliding movement with said movable support rod, said support arm extending from its point of connection with said movable support rod into overlying relation with said stationary support rod; an adjustment screw threadedly carried by said support arm with one end of said screw abuttingly engaging said stationary support rod for sliding movement thereon; tool mounting means including a mounting bore in said support arm spaced from its point of connection to said movable support rod and from said adjustment screw and adapted to successively receive a grinding tool and a jointing tool for grinding and jointing the blades of the cutter head of such a machine in situ, and manually releasable lock means on said support arm for detachably securing such a tool in said mounting bore.

12. For use on a woodworking machine having a work table and a bladed cutter head journaled for rotation about an axis substantially parallel to the work support surface of the work table, an attachment unit for conditioning the cutter blades to provide cutting edges in exact parallelism with said work support surface comprising a base plate having a planar mounting surface adapted to be clamped to the work support surface of said work table, said base plate having a guideway formed thereon parallel to said planar mounting surface and providing a pair of spaced support brackets having support surfaces aligned parallel with said guideway; a support rod rotatable and slidably mounted adjacent its ends in said support surfaces for pivotal movement about and sliding movement axially of an axis parallel to said guideway; a support arm rigidly secured to said support rod intermediate said brackets for rotational and sliding movement with said rod, said arm including a first portion extending toward and beyond an edge of said base plate; an adjustment screw threadedly carried by said first portion of the support arm with one end of said screw abuttingly engaging said guideway for sliding movement thereon; and tool mounting means including a mounting bore in said second portion of the support arm adapted to successively receive a grinding tool and a jointing tool for grinding and jointing the blades of the cutter head in situ.

13. An attachment as defined in claim 12, in combination with clamp means for fixing said base plate to the work table, said means comprising at least one bolt member extending through a bore in the base plate and adapted to threadedly engage in a bore in the work table.

14. An attachment as defined in claim 12, in combination with clamp means for fixing said base plate to the work table, said clamp means comprising a U-shaped clamp element having a base portion fitting over said base plate and leg portions extending below said base plate, at least one clamping screw threaded through a bore in said base portion and abuttingly engaging the adjacent surface of the base plate, and a pair of locking screws each threaded through a bore in a respective one of said leg portions and adapted to engage the work table to fix said clamp element and base plate thereto.

15. A conditioning tool mounting assembly for use in a blade conditioning attachment having a support frame mounting a hinge pin and providing a guideway parallel thereto: said assembly comprising an elongated mounting arm having first, second and third bores normal to and spaced along the lenth thereof, said first bore being substantially normal to said second and third bores and adapted to receive the hinge pin of said attachment, said second bore having mounted therein an adjustable support member adapted to engage the guideway of such an attachment, and said third bore being adapted to selectively receive a grinding tool and a jointing tool and being provided with manually releasable means for locking the selected one of said tools in position therein.

16. A blade conditioning attachment for cutter head equipped power tools comprising a rigid support having means thereon defining a planar support surface in fixed relation thereto, a blade conditioning tool, means mounting said tool on said support for pivotal movement about a predetermined axis fixed in parallel relation to said support surface between operative and inoperative positions and for rectilinear movement parallel of such axis, means on said support defining a rectilinear guide surface in fixed parallel relation to said axis, adjusting means movably carried by said mounting means adjacent said conditioning tool and having a portion abutting said guide surface for locating the operative angular position of the rectilinear path of movement of said tool relative to said support and means for clamping said support to such a power tool with its said support surface in surface contact with a surface on the power tool in parallel relation to the cutter head axis and in a position in which the tool pivot axis is parallel to the cutter head rotation axis and the tool rectilinear path of movement is adjacent the cutter head cutting circle of such a machine.

17. The combination defined in claim 16 including indexing means for locating each blade of the cutter head in proper position for conditioning the cutting edge thereof including an indexing arm having an end portion disposed tangentially with respect to said cutter head for free movement radially with respect thereto and biased toward the cutter head whereby said indexing arm free end portion may ride over the blades when the cutter head is rotated in one direction and will engage under the blades and restrain the cutter head against rotation in the opposite direction.

18. The attachment defined in claim 17 wherein said indexing means is adjustable toward and away from the cutter head along a tangential path whereby the angular position at which the cutter blades are indexed may be varied.

19. The attachment defined in claim 17 wherein said indexing arm free end portion includes a resilient locating finger adapted to engage a blade of the cutter head to restrain the cutter head against rotation in one direction and adapted to be deflected outwardly by the blades to permit rotation of the cutter head in the opposite direction.

20. The attachment defined in claim 17 wherein said indexing arm comprises a rigid arm member pivoted adjacent its end remote from the cutter head.

21. The combination defined in claim 16 wherein said mounting means comprises a tool carrier and journal means pivoting said carrier on said support.

22. The combination defined in claim 16 wherein said tool is a motor driven grinding wheel.

23. The combination defined in claim 16 wherein said tool is a jointing stone.

24. For use on a woodworking machine having a work table and bladed cutter head journalled for rotation about an axis substantially parallel to the work support surface of the work table, an attachment unit for conditioning the cutter blades of such a machine to provide cutting edges in exact parallelism with the work support surface of such a machine comprising an attachment frame removably connectible to such a woodworking machine and having laterally spaced, axially aligned through bores therein and integrally formed mounting pads having coplanar bottom surfaces all lying in a common plane beneath and paralleling the axis of said bores; guide means extending between and fixed in said through bores and having a rectilinear surface parallel to said bore axis to form a guideway parallel to said mounting pad surfaces adapted when said support frame is connected to such a woodworking machine to be disposed in transverse parallel relation to the work support surface of such a machine; a hinge pin supported by and having its axis extending in spaced parallelism to said guideway and to said mounting pad surfaces; a blade conditioning tool mounting assembly carried by said hinge pin for pivotal movement about the axis of said hinge pin and including a conditioning tool support member having a mounting bore adapted to selectively receive a grinding tool and a jointing tool and positioned to locate the selected one of said blade conditioning tools in overlying relation to said cutter head when said support frame is operatively connected to such a woodworking machine; manually releasable lock means on said support member for detachably securing such a tool to said support member in said mounting bore; support means carried by said conditioning tool mounting assembly for engaging said guideway surface and supporting such a selected conditioning tool in contact with a cutter blade whereby movement of the conditioning tool in a transverse path paralleling said guideway is assured; and means on said conditioning tool mounting assembly adapting said assembly for reciprocation in the direction of the axis of said hinge pin to move said blade conditioning tool in its predetermined transverse path from end to end of the cutter blade of such a machine.

References Cited in the file of this patent

UNITED STATES PATENTS

| | | |
|---|---|---|
| 895,579 | Neff | Aug. 11, 1908 |
| 900,284 | Kahle et al. | Oct. 6, 1908 |
| 983,850 | Whipple | Feb. 7, 1911 |
| 1,038,500 | Foley et al. | Sept. 10, 1912 |
| 1,054,936 | Perkins | Mar. 4, 1913 |
| 1,085,876 | Redden | Feb. 3, 1914 |
| 1,193,295 | Perkins | Aug. 1, 1916 |
| 1,651,013 | Buss et al. | Nov. 29, 1927 |
| 2,005,551 | MacDonald | June 18, 1935 |
| 2,377,984 | Ward | June 12, 1945 |
| 2,549,147 | Walter | Apr. 17, 1951 |
| 2,620,606 | Dvorak | Dec. 9, 1952 |
| 2,729,923 | Durst | Jan. 10, 1956 |

FOREIGN PATENTS

| | | |
|---|---|---|
| 2,147 | Great Britain | June 11, 1914 |
| 458,528 | Great Britain | Dec. 22, 1936 |
| 545,475 | Great Britain | May 28, 1942 |
| 857,902 | Germany | Dec. 4, 1952 |